United States Patent [19]

Nishimura et al.

[11] Patent Number: 5,617,141

[45] Date of Patent: Apr. 1, 1997

[54] IMAGE PICKUP DEVICES HAVING AN IMAGE QUALITY CONTROL FUNCTION AND METHODS OF CONTROLLING AN IMAGE QUALITY IN IMAGE PICKUP DEVICES

[75] Inventors: Ryuji Nishimura, Yokohama; Takuya Imaide, Fujisawa, both of Japan

[73] Assignee: Hitachi, Ltd., Tokyo, Japan

[21] Appl. No.: 52,094

[22] Filed: Apr. 23, 1993

[30] Foreign Application Priority Data

Apr. 28, 1992  [JP]  Japan .................... 4-110347

[51] Int. Cl.⁶ .................................. H04N 5/238
[52] U.S. Cl. .................. 348/366; 348/370; 348/223; 348/221; 348/229; 348/234
[58] Field of Search .................. 358/228, 213.19, 358/161, 209; 348/362, 363, 364, 366, 370, 223, 221, 229, 234; H04N 5/238

[56] References Cited

U.S. PATENT DOCUMENTS

| | | | |
|---|---|---|---|
| 5,049,997 | 9/1991 | Arai | 358/213.19 |
| 5,065,232 | 11/1991 | Kondo | 348/224 |
| 5,084,754 | 1/1992 | Tomitaka | 358/228 |
| 5,086,314 | 2/1992 | Aoki et al. | 358/228 |
| 5,086,319 | 2/1992 | Aoki et al. | 358/228 |
| 5,093,716 | 3/1992 | Kondo et al. | 358/213.19 |
| 5,111,301 | 5/1992 | Haruki et al. | 358/228 |
| 5,128,769 | 7/1992 | Arai et al. | 358/213.19 |
| 5,182,658 | 1/1993 | Ishizaki et al. | 358/213.19 |
| 5,247,367 | 9/1993 | Lee | 358/213.19 |

FOREIGN PATENT DOCUMENTS

| | | | |
|---|---|---|---|
| 56-19274 | 2/1981 | Japan | H04N 5/193 |
| 63-219291 | 9/1988 | Japan | H04N 9/73 |

*Primary Examiner*—Leo Boudreau
*Assistant Examiner*—Bipin Shalwala
*Attorney, Agent, or Firm*—Antonelli, Terry, Stout & Kraus, LLP

[57] ABSTRACT

An image pickup device including an image pickup unit for converting an optical image of a subject to an image signal, a signal processor for producing a video signal from the image signal, an ambience determining unit for determining image pickup ambience of the subject, and a control unit for controlling image quality of the video signal output from said signal processor in accordance with a result of the determination of the ambience determining unit. The image quality control unit includes at least one of a white balance control unit, an exposure control unit, and a configuration correction/chroma signal gain control unit. The control characteristic of the image quality control unit is changed depending on the result of the determination of the ambience determining unit.

22 Claims, 7 Drawing Sheets

IMAGE PICKUP DEVICES HAVING AN IMAGE QUALITY CONTROL FUNCTION AND METHODS OF CONTROLLING AN IMAGE QUALITY IN IMAGE PICKUP DEVICES

BACKGROUND OF THE INVENTION

1. Field of the Invention

The present invention relates to image pickup devices mounted on video cameras, VCR-embedded cameras, or electronic still cameras, and more particularly to an image pickup device having an automatic image controlling function such as auto white balance and or automatic exposure control, and an image quality control method in an image pickup device.

2. Description of the Related Art

Image pickup devices of this type require white balance adjustment for providing stable color reproduction, exposure adjustment for obtaining an appropriate quality of exposure, and other image quality adjustment. The operator manually makes these adjustments so as to provide an optimal value in consideration of a subject and its ambience of image pickup for image pickup purposes. In many cases, an image pickup device mounted on a domestic VCR-embedded type camera has the function of auto white balance and automatic exposure control for automatically making these adjustments so that general users can easily pick up an image.

The auto white balance which is one of the automatic adjustment functions is disclosed, for example, in JP-A-63-219291 and the automatic exposure control in JP-A-56-19274.

SUMMARY OF THE INVENTION

The auto white balancing involves automatic control of the gain of a chroma signal such that a part of an image signal which is determined as white is reproduced in white in spite of the color temperature of a source of light. In other words, the auto white balance is an adjustment for correct reproduction of a subject by discrimination of the color of the subject from the color of the source of light. However, the conventional image pickup device which has the functions of auto white balance and automatic exposure adjustment has the following problems: it cannot make complete discrimination of the color of the subject from the color of the source of light by using only an image signal which includes a mixture of signals indicative of the colors of the source of light and the subject. The image pickup device can malfunction by determining a colored subject in the presence of light from a source of light as a white subject in the presence of light from another source of light.

The conventional exposure control places a possible subject, for example, at the center of a picture under appropriate exposure, but there is not necessarily a subject at that position. Thus, the exposure control may malfunction.

Thus, it is an object of the present invention to provide an image pickup device which solves the above problems and has the high-performance function of white balance control, and/or exposure control and an image quality control method in the image pickup device.

According to one aspect of the present invention, there is provided an image pickup device including an image pickup unit for converting an optical image of a subject to an image signal, a signal processor for producing a video signal from the image signal, an ambience determining unit for determining the image pickup ambience of the subject, and a unit for controlling the image quality of the video signal output from the signal processor in accordance with the result of the determination of the ambience determining unit.

According to one example of the present invention, the image quality controlling unit controls the gain of a chroma signal of the video signal output from the signal processor in accordance with the result of the determination of the image pickup ambience to provide white balance control.

According to one example of the present invention, the image quality controlling unit controls the stop of the image pickup unit in accordance with the result of the determination of the image pickup ambience to provide exposure control.

According to one example of the present invention, the ambience determining unit determines which of at least two of the indoors, outdoors, daytime and night the image pickup ambience belongs to.

According to an example of the present invention, the ambience determining unit determines the image pickup ambience on the basis of at least two of the illumination, distance, and image pickup time of the subject.

According to an example of the present invention, the image pickup device further includes at least two of a unit for detecting a distance from the image pickup device to the subject, a unit for detecting a stop value, and a unit for outputting time data, and wherein the ambience determining unit determines the image pickup ambience on the basis of at least two of the distance detecting unit, the stop value detecting unit, and the time data outputting unit.

According to an example of the present invention, the ambience determining unit includes a unit for calculating the illumination of the subject on the basis of an amplification degree to which the image signal is amplified before the signal is applied to the signal processor, a shutter speed or an exposure time, a stop value and the level of a luminance signal in the video signal.

According to another aspect of the present invention, an image quality control method in an image pickup device includes an image pickup unit for converting an optical image of a subject which is picked up to an image signal and a signal processor for producing a video signal on the basis of the image signal, the method includes the steps of determining the image pickup ambience of the subject and controlling the image quality of the video signal from the signal processor in accordance with the result of determination of the image pickup ambience.

According to an example of the present invention, the image pickup ambience determining step includes the steps of inferring and determining the image pickup ambience using a knowledge of fuzziness.

According to an example of the present invention, the image pickup ambience determining step includes the steps of classifying into a plurality of regions each of at least two of the illumination, distance, and image pickup time of the subject; obtaining the grade of adaptation of the detected values of at least two of the illumination, distance, and image pickup time of the subject into the plurality of regions; and determining the image pickup ambience on the basis of the obtained degrees of adaptation.

According to an example of the present invention, the ambience determining unit, which determines an image pickup ambience, determines pickup ambience such as day or night, the outdoors or indoors on the basis of at least two items of data on the distance to a subject, the zoom scale factor and stop value of a lens used; time data on date and time; and data on an image signal from a signal processor. Control characteristic such as exposure control and white balance control is changed depending on image pickup ambience on the basis of the result of the ambience determination, thus obtained. Thus, control is provided in conformity with the image pickup ambience to thereby prevent malfunction of exposure control and/or white balance control to achieve further sophistication of the control functions.

DESCRIPTION OF THE PREFERRED EMBODIMENTS

The respective embodiments of the present invention will be described below with respect to FIGS. 1 to 11.

Figure 1:
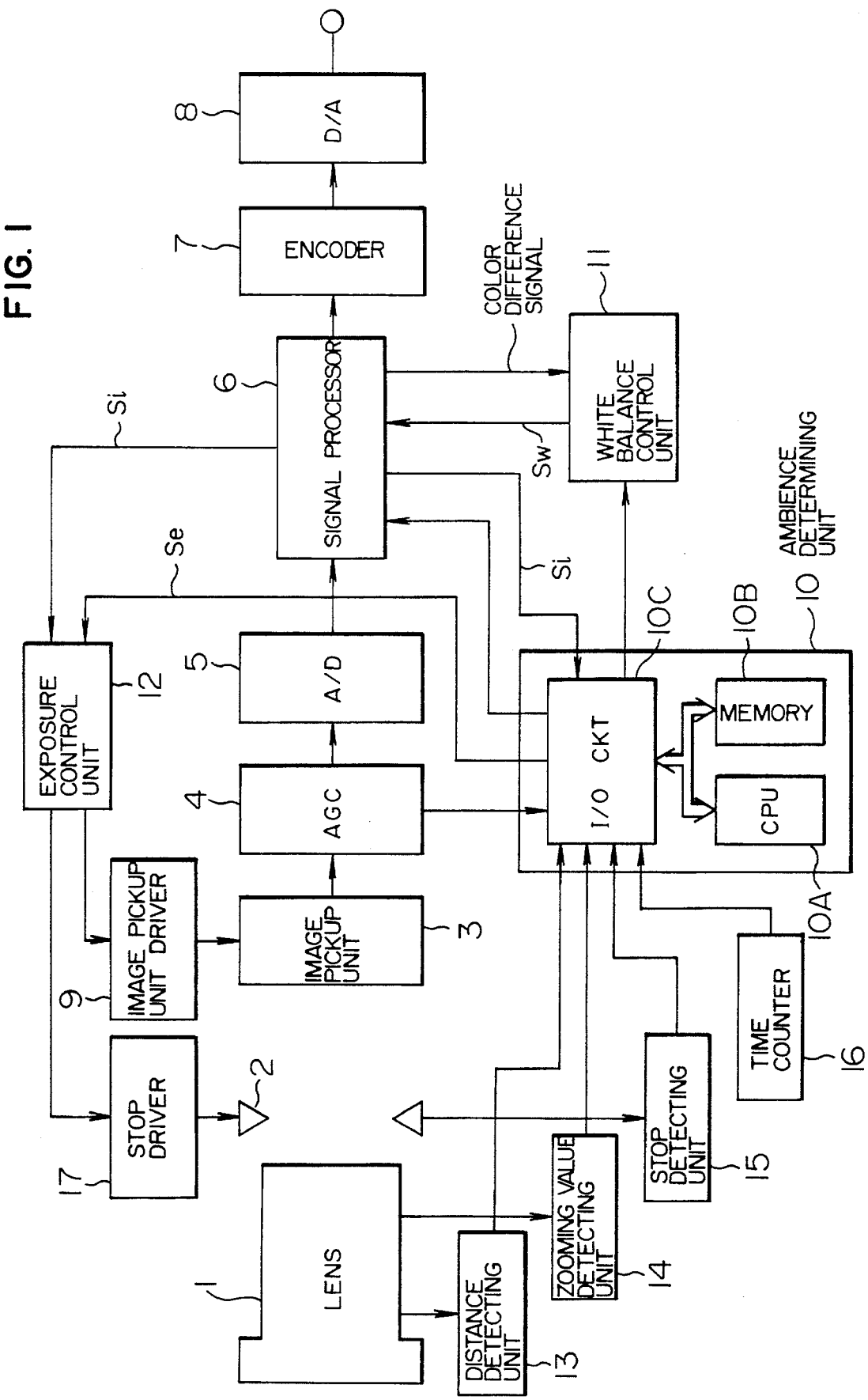
FIG. 1 is a block diagram of an image pickup device as a first embodiment of the present invention.

FIG. 1 is a block diagram of an image pickup device as a first embodiment of the present invention. In FIG. 1, a lens system 1 is composed of a focusing lens and a zooming lens. A stop 2 which adjusts a quantity of incident light is driven by a stop drive unit 17. An image pickup unit such as charge-coupled device (CCD) 3 optically converts the image of a subject focused on an image pickup surface by the lens system 1 to an image signal. An image pickup device is composed of the stop 2 and the image pickup unit 3. The output signal of the image pickup unit 3 is amplified by an automatic gain control (AGC) unit 4 into a predetermined signal level. The resulting analog signal is converted by an analog-to-digital (A/D) converter 5 to a digital signal.

A signal processor 6 generates a video signal, i.e., a luminance signal and a chroma signal, from the image pickup signal. The video signal is then subjected to well-known signal processing such as gamma correction. The video signal, i.e. the luminance signal and the chroma signal, from the signal processor 6 is converted by an encoder 7 to a digital signal in conformity to a standard television signal such as NTSC. The digital signal is then converted to a standard analog signal by a digital-to-analog (D/A) converter 8. The analog signal is then output.

A white balance control unit 11 controls the signal processor 6 such that a white subject is reproduced in white irrespective of a change in the color temperature, which is one of image pickup ambiences where the image of the subject is picked up. An exposure control unit 12 controls the stop 2 through the stop drive unit 17 so as to obtain an appropriate image signal and also controls the exposure time or shutter speed of the image pickup unit 3 through an image pickup device driver 9.

In the embodiment, in order to improve the performance of white balance and exposure control, an ambience determining unit 10 determines the image pickup ambience. The ambience determining unit 10 is provided with a CPU 10A, a memory 10B, and an input/output (I/O) circuit 10C. In the embodiment, the ambience determining unit 10 receives through the I/O circuit 10C data on the distance to the subject from a distance detecting unit 13, data on a zooming scale factor from a zooming value detecting unit 14, data on the stop value from a stop detecting unit 15, data on time such as date, time, etc., from a time data output unit, for example, a time counter 16, data on an amplification degree from the AGC unit 4, and data on the image signal from the signal processor 6. The ambience determining unit 10 determines the current image pickup ambience on the basis of these data. It is noted that data on the zooming value detecting unit 14 and the time counter 16 is not used.

Figure 2:
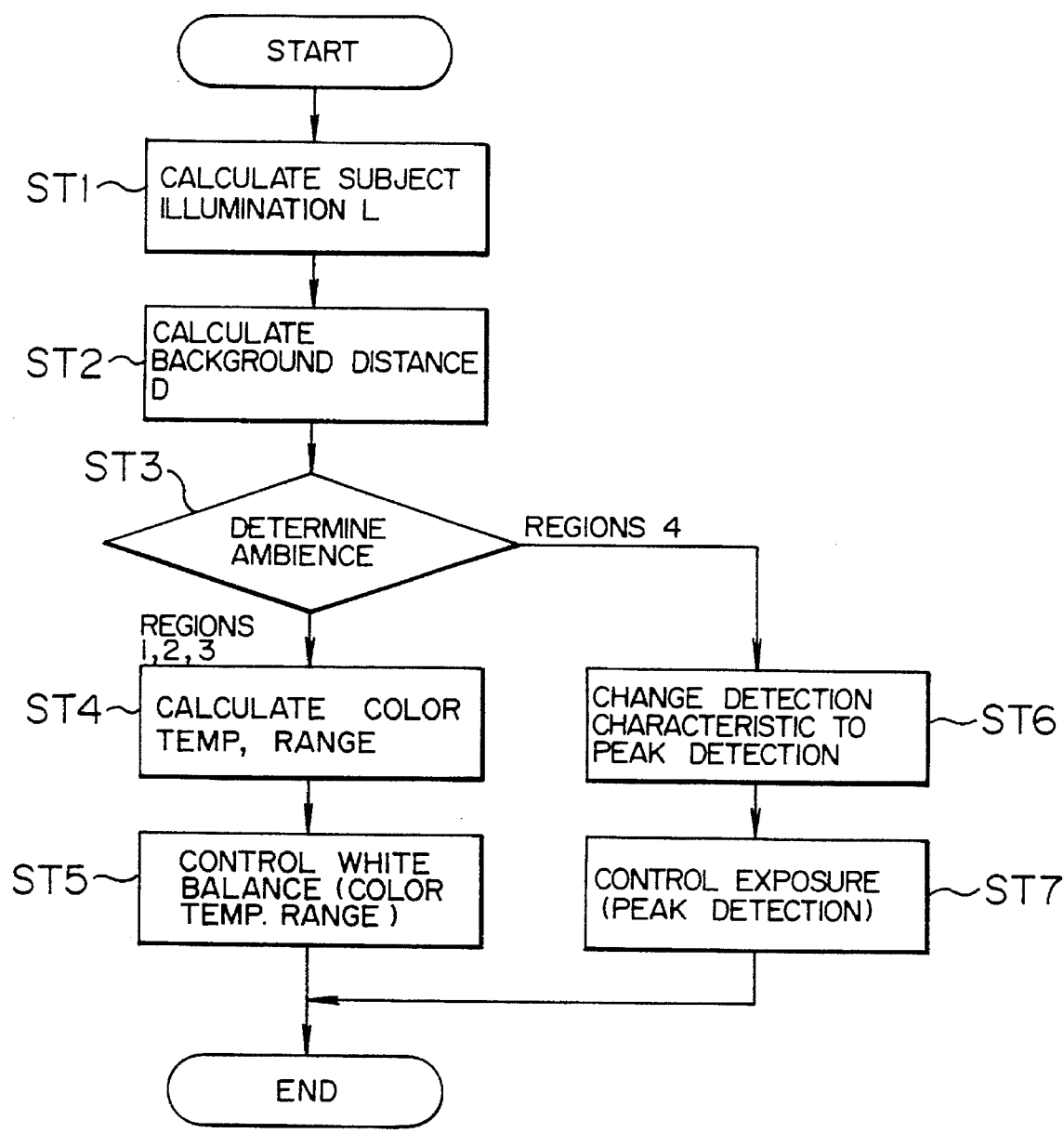
FIG. 2 is a flowchart indicative of a control algorithm of the first embodiment.

FIG. 2 is a flowchart of a control algorithm including determination of an image pickup ambience, white balance control, and exposure control, provided by the ambience determining unit 10. A process for determination of an image pickup ambience, white balance control, and exposure control will be described below. As shown at steps ST1 and ST2 of FIG. 2, the illuminance L of a subject and a background distance D, which are parameters effective for ambience determination, are first calculated in the present embodiment.

Data on the stop value from the stop detecting unit 15 of FIG. 1, the amplification degree from the AGC unit 4, and the level of a luminance signal from the signal processor 6 are used in order to calculate the subject illuminance L. The illuminance of the subject is calculated as follows: Let the instantaneous value of the subject illumination be $L_o$, which is represented by $$L_o = Si/(G \cdot Sh \cdot F) \quad (1)$$

where G is the amplification degree or gain of the AGC unit, Sh is the shutter speed or exposure time, F is the stop value, and Si is the level of the luminance signal.

The level Si may be had by the ambience determining unit 10.

$L_o$ is inversely proportional to the product of G, Sh and F. If only G and Si are available, $L_o$ may be represented as $Si/G$. If only G, Sh and Si are available, $L_o$ may be represented as $Si/(G \cdot Sh)$.

Figure 3:
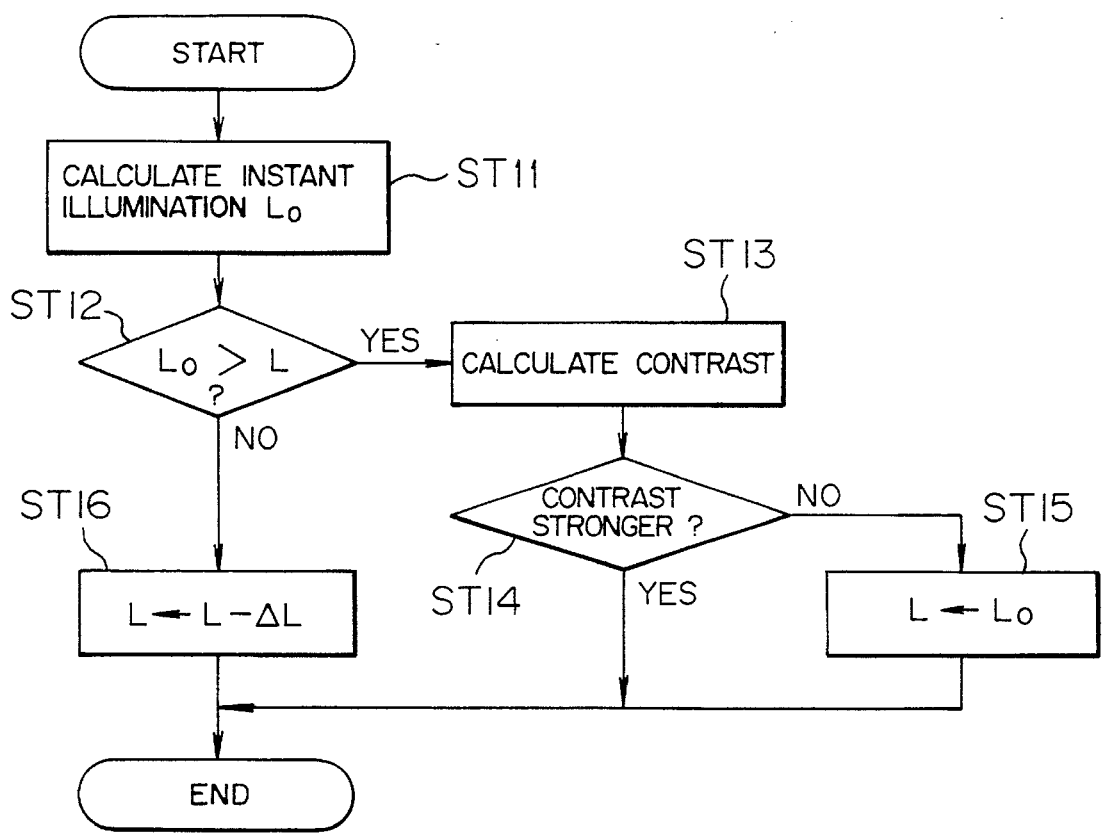
FIG. 3 is a flowchart indicative of a subject illumination calculation in the flow of the process of FIG. 2.

The illumination of the subject is calculated using $L_o$ as follows: FIG. 3 illustrates an example of an algorithm for calculation of the subject illumination L, which may be performed at predetermined intervals of time. The algorithm will be described below. The subject illumination is proportional to the level of the image signal when the image of a subject having a 100% reflectivity is picked up. Assume that the luminance of the source of light is constant. Since the instantaneous illumination $L_o$ is considered to change depending on the reflectivity of the subject, the subject illumination can be obtained by calculating L while holding the peak value of the instantaneous illumination $L_o$.

First, the instantaneous illumination $L_o$ is obtained in accordance with expression (1) at step ST11 of FIG. 3. The calculated $L_o$ is compared with L stored in the memory 10B at step ST12. When the $L_o$ has a larger value than L, $L_o$ is changed to L(L←$L_o$), following steps ST13–ST15. When the $L_o$ has a smaller value than L, L is changed (decreased) by a predetermined small value ΔL to cause L to approach $L_o$, i.e., L–ΔL is replaced by L at step ST16. ΔL may be, for example, less than 1% of L because the subject illumination is considered to change not rapidly but slowly.

In order to protect the calculated value of L from influence by direct image pickup of a source of light such as a spot light, the contrast of a picture is calculated at step ST13. It is then determined whether the contrast is stronger than a predetermined value at step ST14. If so, it is determined as being a source of light and excluded. If not, $L_o$ is replaced with L at step ST15.

After calculation of L, as mentioned above, the distance D is calculated at step ST2. The distance D is the depth of the image pickup D ambience including the subject. Data on the distance D from the distance detecting unit 13 as it is may be used as the distance D. The distance detecting unit 13 detects the distance, for example, on the basis of the positions of the zoom lens and focus lens. Since an image pickup device having an auto-focusing function can calculate the distance from the camera to the focused subject, data on the distance may be used. Alternatively, the distance may be calculated in accordance with an algorithm such as holds a peak value as in the calculation of the subject illuminance.

Figure 4:
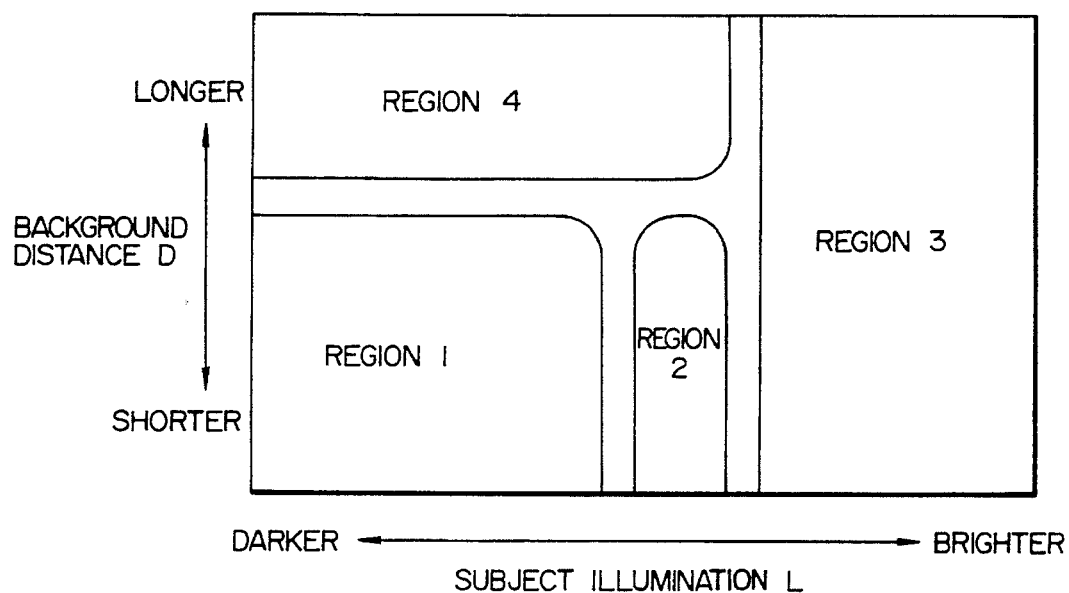
FIG. 4 illustrates one example of region division used in ambience determination in the flow of the process of FIG. 2.

When the subject illumination L and the distance D are thus obtained, the determination of the ambience is made at step ST3 of FIG. 2. FIG. 4 shows one example of division of the region of the image pickup ambience. In FIG. 4, the axis of abscissas represents the subject illumination L and the axis of ordinate the distance D, with a total region being divided into four ambiance regions. In a region 1, the subject illumination is relatively low and the distance D is relatively small, and this region corresponds to an indoor one. In a region 3, the subject illumination is relatively high, and this region corresponds to the outdoor one. In a region 2, the subject illumination is intermediate, and the distance D is relatively small, and this region corresponds to a studio. A region 4 where the distance D is large and the subject illumination is not high corresponds to a night view or theatergoing. The ambience determining unit 10 determines which of the regions 1–4 the image pickup ambience corresponds to on the basis of the subject illumination L and distance D obtained at steps ST1 and ST2.

Data on the relationship between L and D shown in FIG. 4 may be stored, for example, in the form of a map in the memory 10B.

White balance and exposure control after the determination of the ambience will now be described. If the ambience can be determined in the adjustment of white balance, its illumination conditions can be determined to some extent. The possibility that, for example, outdoor illumination is sunlight in the daytime is very high. As a result, a change in the color temperature can be limited to be within a predetermined range. When control is provided which exceeds the predetermined range in the correction of white balance, this control is determined as a malfunction.

The white balance control will be now described.

The signal processor 6 is provided with amplifiers to change the respective gains of R (red) and B (blue) signals to adjust white balance. For example, let the respective average values of the R and B signal voltages for a given time be Ra and Ba. The gains of the amplifiers for R and B signals are set substantially at Gr=k/Ra, and Gb=k/Ba where Gr and Gb are the amplification gains of the R and B signals, respectively, and k is a constant. By setting the amplification gain so as to be proportional to the inverse of the valve of a signal concerned, as just described above, a white subject will always be reproduced in white. This is because even if the color temperature changes, so that the quantities of R and B components contained in the source of light fluctuate to bear a trace of red or blue, the output average values of quantities of the R and B signals are controlled so as to be substantially equal.

The color temperature of the source of light has a given relationship to the ratio of the R to B signals. This implies that the respective amplification gains and color temperatures of the R and B signals present when white balance is being adjusted have a one-to-one correspondence. That is, when the upper and lower limits of the color temperature are known, the amplification gains of the R and B signals are suppressed to within corresponding predetermined limits to prevent malfunction of the white balance control. Thus, the ambience determining unit 10 calculates the range of the color temperature to set the upper and lower limits of the chromatic range and delivers a signal indicative of such limits to the white balance control unit 11, which delivers to the signal processor 6 a signal SW indicative of the limits for the amplification gains of the R and B signals depending on the upper and lower limits of the color temperature to thereby control the gains of the amplifiers.

Thus, when the ambience is determined as being in the region 3 at step ST3 of FIG. 2, the region is the outdoor one. Thus the ambience determining unit calculates the range of color temperature corresponding to the region 3 (step ST4) and sets the upper and lower limits of the range of color temperature so that the color temperature is in the vicinity of a color temperature of 5,500K. The white balance control unit 11 delivers to the chroma signal processor a signal indicative of the limits of the amplification gains of the R and B signals corresponding to the upper and lower limits of the range of color temperature to thereby control the white balance (ST5). Similarly, when the ambience is determined as being in the region 1 at step ST3, the region is the indoor one, and illumination is considered as being of an incandescent lamp or of a fluorescent lamp. Thus, the range of color temperatures is calculated; the upper and lower limits of the range of color temperatures is set such that the color temperatures is less than 5,000K; the amplification gains of the R and B signals corresponding to the upper and lower limits are calculated; and the white balance control is provided. Similarly, when the ambience is determined as being in the region 2 at step ST3, the region is a studio or the like, and illumination is considered as being between sunlight and a fluorescent lamp. Thus, the range of color temperatures is calculated; the upper and lower limits of the range of the color temperatures are set so that the color temperature is a proper one in a range of 5,000–5,500K; and the white balance control is provided.

Exposure control will now be described.

The exposure control is generally such that the exposure control unit 12 compares an image signal voltage Siv and a reference voltage Vr using a built-in comparator and delivers its output value C×(Siv−Vr) to the stop driver 17, thereby to control the stop value. C represents a constant depending on the characteristic of the comparator.

As the detection characteristic of the exposure control, two characteristics, i.e., peak detection and average value detection, are known. The peak detection uses as an image signal voltage Siv, a signal which is highest in luminance level or peak value in the picture. The average value detection is to average all signals in the picture to provide the resulting signal Siv.

Generally, in the case of peak detection, when the image of a subject of high contrast is picked up, an appropriate signal level is obtained for a high luminance portion of the subject because a stop is controlled while a lower luminance portion of the subject is darkened, so that the darkened image cannot be recognized, disadvantageously. In the average detection, the stop is opened. Thus, a signal level of some extent is obtained for that portion of the subject of a lower luminance, while a subject portion of higher luminance becomes white and its image cannot be recognized.

The present embodiment is intended to improve the performance of the exposure control by using an appropriate one of both the detection characteristics depending on the image pickup ambience. More particularly, the exposure control unit 12 prepares the peak and average values of the levels Si of luminance signals from the signal processor 6, adds those signals in a ratio to provide an image signal voltage Siv. At this time, if the ratio is set such that the peak value is larger than the average value, the detection characteristic is obtained from the peak value. Therefore, by delivering a signal Se indicative of the ratio from the ambience determining unit 10 to the exposure control unit 12, the detection characteristic is controlled.

Thus, when the ambience is determined as the region 4 at step ST3 of FIG. 2, the ambience determining unit sets the ratio so as to change the detection characteristic of the exposure control unit 12 to provide peak detection (step ST6) and delivers the signal Se to the exposure control unit 12 to thereby provide exposure control (step ST7). This region 4 is considered as being theatergoing, marriage ceremony or night view, and there are scenes of high contrast in many cases. In such a case, setting the ratio in the peak detection prevents a bright portion of the subject from whitening, which would cause the details of that portion to disappear.

While the ambience determining unit 10 of FIG. 1 is composed of a microcomputer and its control program, as described above, it may be composed of other hardware which operates similarly to the microcomputer.

As described above, in the present embodiment, the image pickup ambience is determined on the basis of the distance to a subject, a stop value, an amplification degree of a circuit, and a signal level; and white balance control and exposure control are provided depending on the ambience, so that a malfunction of those control functions is prevented.

Figure 5:
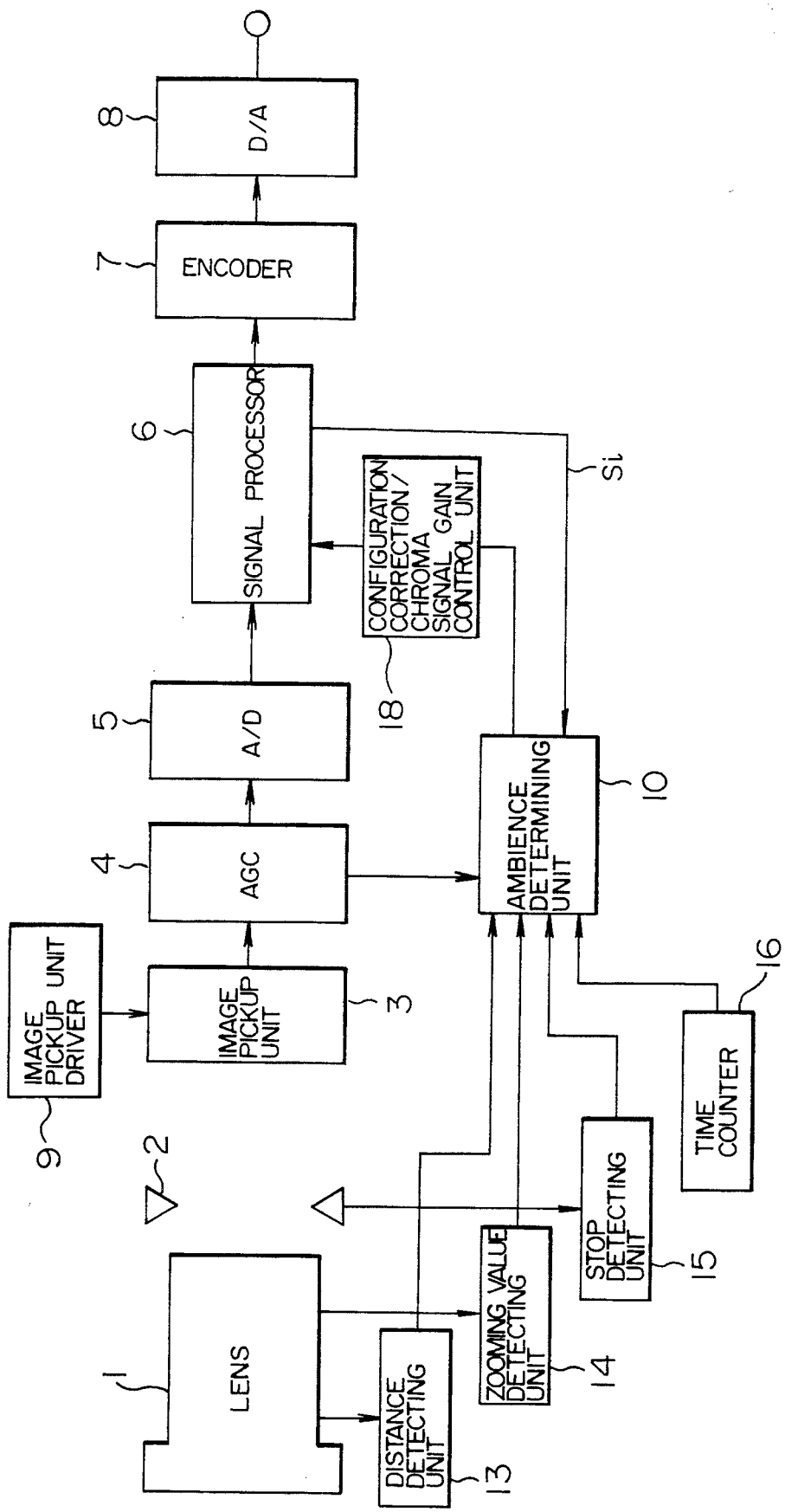
FIG. 5 is a block diagram of an image pickup device as a second embodiment of the present invention.

A second embodiment of the present invention will be described with respect of FIGS. 5 and 6. FIG. 5 is a block diagram of an image pickup device as the second embodiment, which is the same as the first embodiment except that a configuration correction/chroma signal gain control unit 18 controls a configuration correction and/or chroma signal gain on the basis of the result of determination of the ambience. In FIGS. 5 and 1, the same reference numerals are used to denote elements having the same function, and further description thereof will be omitted for avoiding duplication.

Digitalized image pickup devices generally have a high degree of freedom of setting a picture quality. Such device is disclosed, for example, in JP-A-1-00008. A signal processor 6 of FIG. 5 is arranged so as to control the picture quality similarly to the reference.

Figure 6:
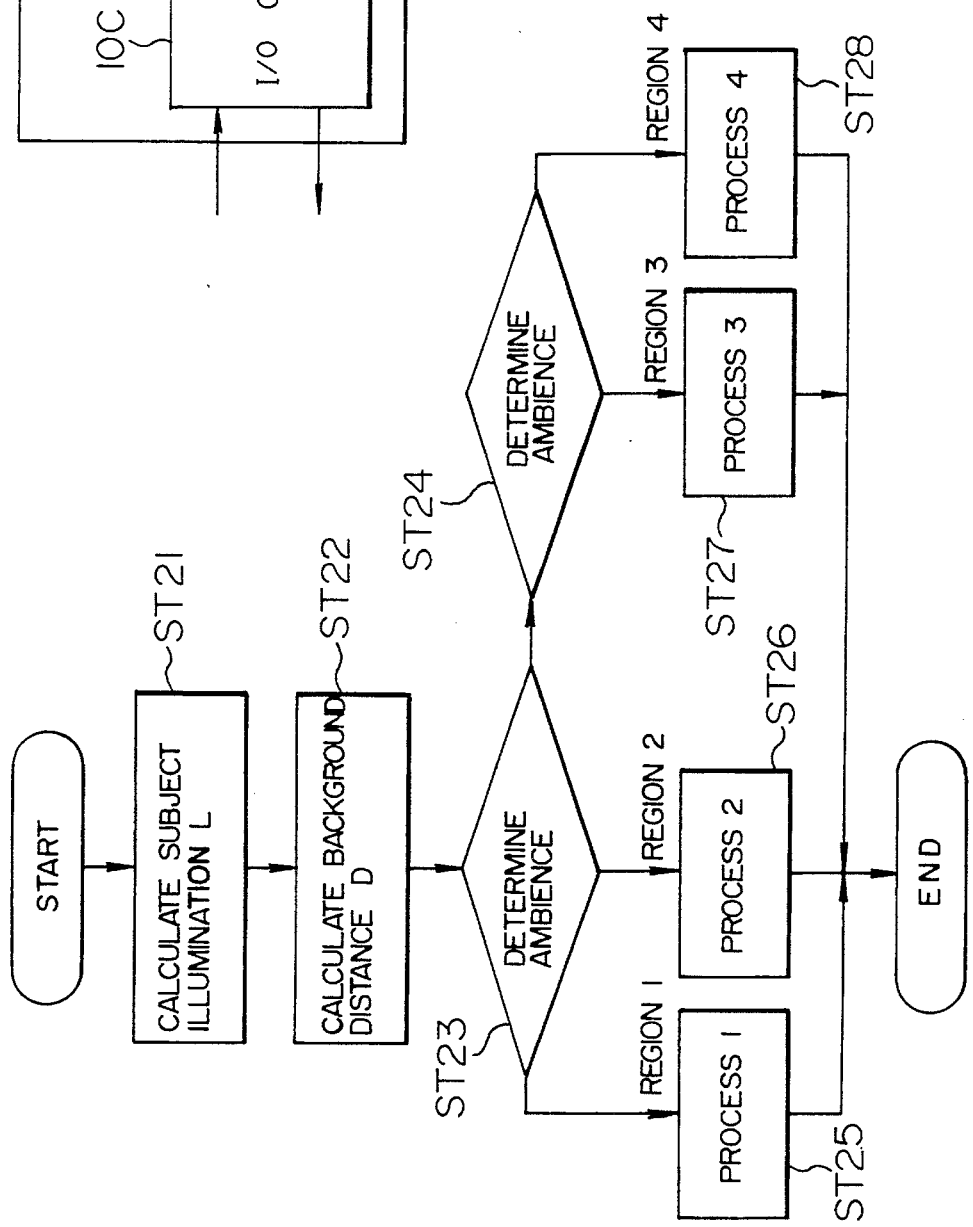
FIG. 6 is a flowchart indicative of a control algorithm of the second embodiment.
Figure 8A:
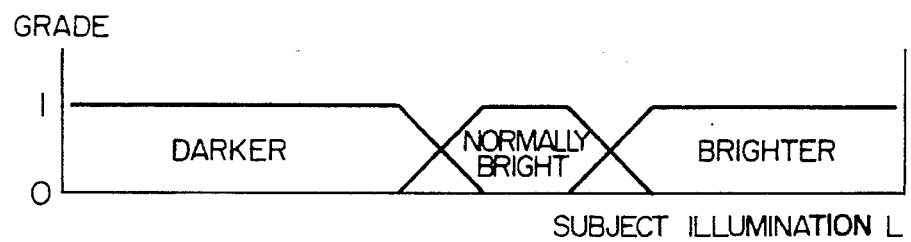
FIGS. 8A to 8C illustrate membership functions used in a fuzzy inference process in the third embodiment.
Figure 8B:
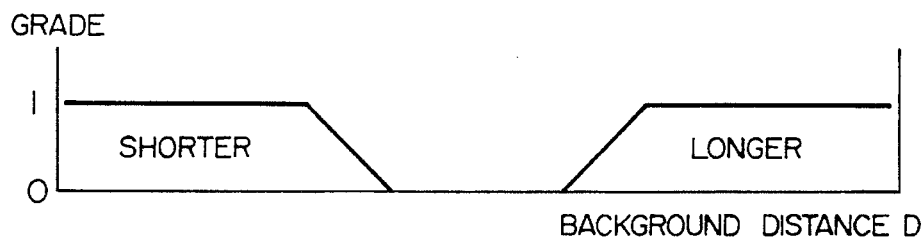
Figure 8C:
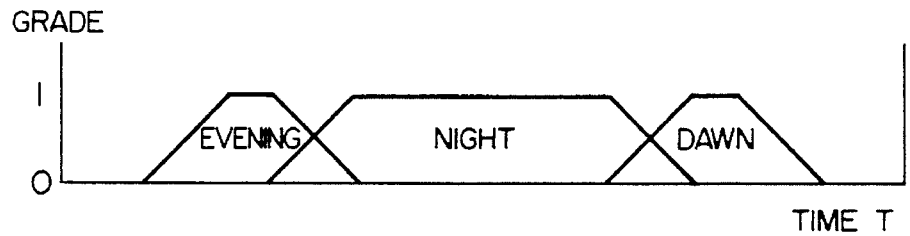
Figure 9A:
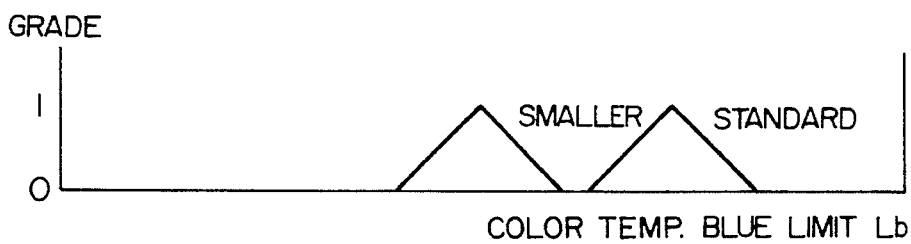
FIGS. 9A to 9C illustrate membership functions used in a fuzzy inference process in the third embodiment.
Figure 9B:
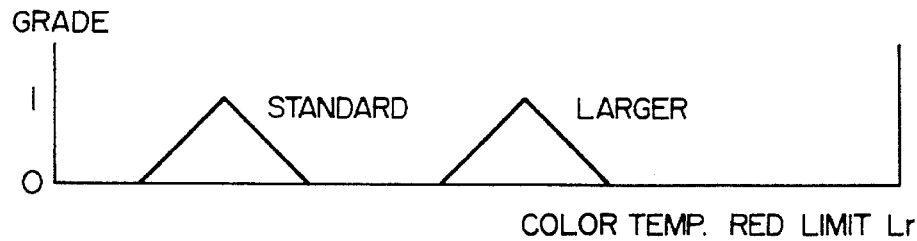
Figure 9C:
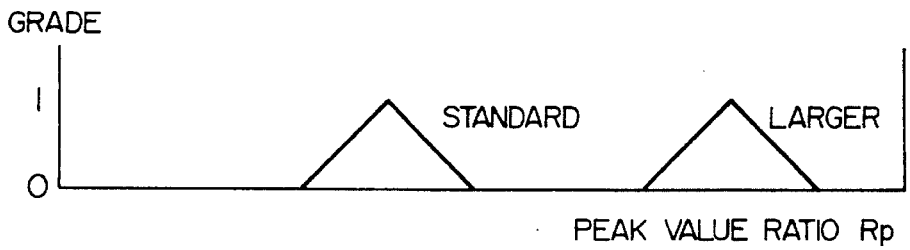

FIG. 6 is a flowchart of a control algorithm in this embodiment substantially similar to that of FIG. 2. The calculation of a subject illumination L at step ST21 and a distance D at step ST22 are the same as those at steps ST1 and ST2, respectively, of FIG. 2. At step ST23 it is determined whether the image pickup ambience is the region 1 or 2. If so, the corresponding processes 1 and 2 are performed at steps ST25 and ST26, respectively. If the determination is not the region 1 or 2, it is determined at step ST24 whether the ambience is the region (3) or (4). If so, the corresponding process 3 or 4 is performed at step ST27 or ST28.

These processes 1–4 are arbitrary ones, for example, as follows. Correction to the configuration is somewhat strongly performed in the region 3 which is the outdoor one. Since the indoor region 1 is relatively dark, configuration correction is set somewhat weakly such that noise is not outstanding. The gains of the chroma signals (R, G and B signals) are somewhat reduced to lighten the colors. Other regions are handled as for standard configuration correction and chroma signal gain, as described above.

When a signal indicative of the determined region is delivered from the ambience determining unit 10 to the configuration correction/chroma signal gain control unit 18, the control unit 18 delivers signals which control the amplification gains of the R, B and G signals to the signal processor 6 to control the density of the color and/or delivers the configuration control signal to the signal processor 6 to thereby correct the configuration of the luminance signal.

As described above, in the second embodiment, configuration correction is made, and control of the chroma signal gains is provided, so that a satisfactory image quality is obtained even when the image pickup ambience changes.

The first and second embodiments may be combined to provide all the image quality control, white balance and exposure control depending on the ambience.

In the respective embodiments, the ambience determining unit may determine which of the indoors, outdoors, daytime or night the image pickup ambience belongs to.

The ambience determining unit may determine the ambience on the basis of at least two of the subject illumination, background distance and image pickup time.

The ambience determining unit may determine the ambience on the basis of at least two of the output signals from the distance detection unit, stop value detecting unit and time counter.

A third embodiment of the present invention will be described below with respect to FIGS. 7–10. Although a block diagram of an image pickup device of this embodiment is not illustrated, it is similar to FIG. 1. In the present embodiment, white balance and exposure control are provided on the basis of three parameters; that is, subject illumination L, distance D and time T in accordance with fuzzy inference.

Figure 7:
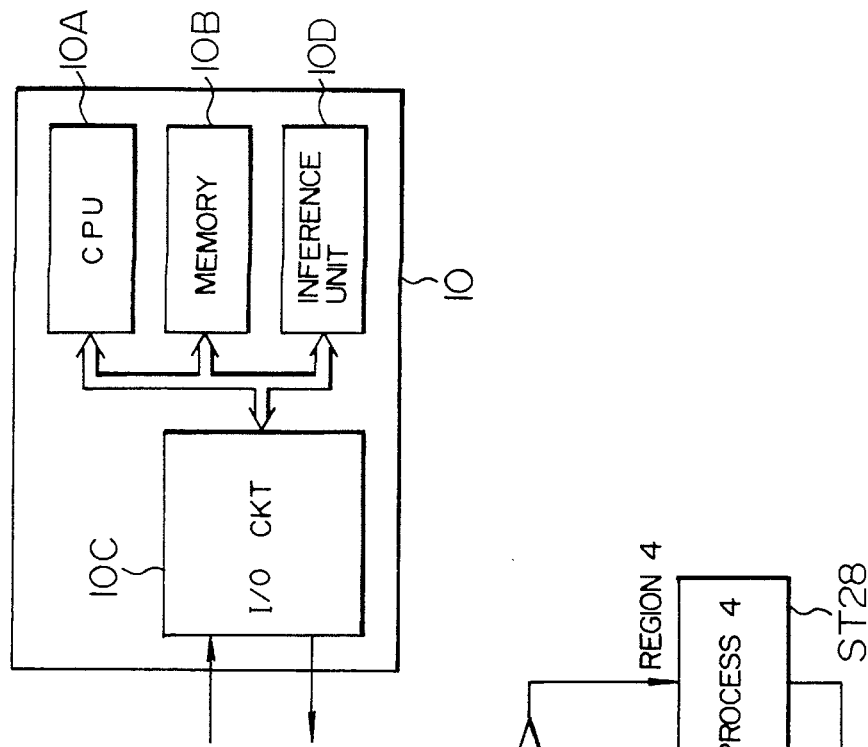
FIG. 7 shows the structure of an ambience determining unit of a third embodiment of the present invention.

To this end, in the present embodiment, the ambience determining unit 10 is composed of a CPU 10A, I/O circuit 10C, memory 10B, and a fuzzy inference unit 10D, as shown in FIG. 7. The memory 10B stores data on rules of fuzziness and data on membership functions of FIGS. 8A to 9C. The inference unit 10D determines to which of lower brightness (or being dark), medium brightness and higher brightness the current brightness belongs on the basis of the subject illumination L and distance D, obtained in the same manner as steps ST1 and ST2 of FIG. 2, and time data from the time counter 16 in accordance with the membership function of FIG. 8A, determines whether the distance D is short or not in accordance with the membership function of FIG. 8B and determines whether it is now evening, night or dawn in accordance with the membership function of FIG. 8C.

The fuzzy inference by the inference unit 10D is performed in conformity to the following rules, for example:

Rule 1: If the ambience is bright, the upper limit (blue limit) Lb of the control range of white balance control is small and the lower limit (red limit) Lr is large;

Rule 2: If the ambience is dark, its distance D is short, and the ambience is also at night, Lb is small;

Rule 3: If the ambience is dark or medium-bright and its distance D is long, the ratio Rp of the peak value is large in the combined value of the peak value and the average value in the exposure control;

Rule 4: If the ambience is medium-bright and at evening or dawn, Lb is small and the lower limit Lr is large; and Rule 5: in the other cases, standard setting is employed.

In Rule 1, if bright, the image pickup ambience is outdoor, so that the range of color temperature control is limited to the vicinity of sunlight. In Rule 2, the image pickup ambience is indoor at night, so that the color temperature is limited to a low one. In Rule 3, the image pickup ambience is a night view or theater-going. In such scene, a spotlight is on a subject in many cases. If the subject is of high illumination, it becomes white and its details become difficult to see in many cases. In order to avoid this situation, the ratio Rp of the peak value in the exposure control is increased to prevent the occurrence of the phenomenon as an exposure control characteristic from the peak detection. Rule 4 is for picking up the beautiful image of a morning or evening glow. By limiting the range of color temperature control, a reddish setting sun is reproduced beautifully with its own unchanged color.

FIGS. 8A to 9C show an example of fuzzy membership functions in these control rules. White balance control is provided using Lr and Lb obtained finally in accordance with the rules; the detection characteristic is determined using Rp; and exposure control is thereby provided. More particularly, the ambience determining unit 10 delivers signals indicative of the values of Lr and Lb obtained finally to the white balance control unit 11, which, in turn, delivers to the signal processor 6 signals indicative of the limits of the amplification gains of the R and B signals corresponding to the values of these Lr and Lb. The ambience determining unit 10 delivers a signal indicative of the ratio Rp obtained finally to the exposure control unit 12 to thereby control the detection characteristic.

Figure 10:
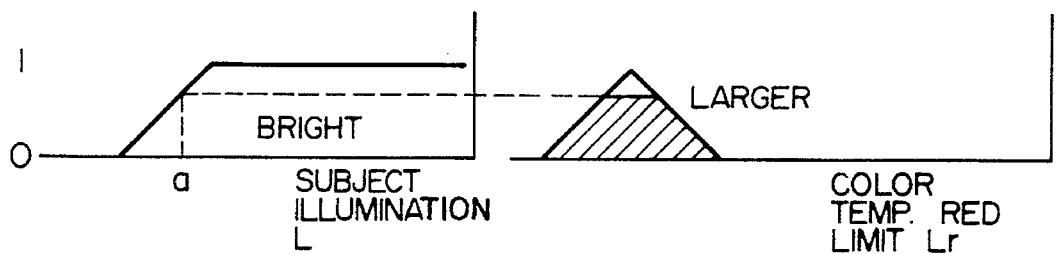
FIG. 10 illustrates one example of a membership function used in the final inference of the fuzzy inference process in the third embodiment.

The values of Lr, etc., are calculated as follows. FIG. 10 shows a membership function, for example, in the inference 1 (rule 1). Let the value of luminance L be a. When the ambience is bright, the value of Lr is large on the basis of the inference 1, so that the centroid of a hatched area is calculated which has less than a grade a of a membership function indicative of the magnitude of the color temperature limit Lr, as shown in FIG. 10. Similarly, the centroid of Lb is calculated from the inference 1.

Also, in the inference (2), the respective centroids of the corresponding hatched areas are calculated, using the membership functions of Lr, Lb and Rp in the same manner as in the inference (1). At this time, if the pre-condition includes "and" as in the inference (2), the minimum grade value is employed while if it includes "or" as in the inference (3), the maximum grade value is employed.

The total centroid of the respective centroids of Lr, obtained, as described above, in accordance with the inferences (1)–(4) is calculated and used as the final value of Lr.

Similarly, also, for Lb and Rp, the total centroid of the respective centroids of each of Lb and Rb obtained, as described above, in accordance with the inferences (1)–(4) is calculated, and used as the final value of each of Lb and Rp.

Since the present embodiment uses a fuzzy inference in the region determination (determination of the image pickup ambience), the control characteristic can be changed continuously even when the region is changed to another to thereby provide natural control. Especially, in the boundary between any adjacent regions, smooth white balance control and exposure control are provided.

The present embodiment may be modified so as to provide image quality control such as that in the second embodiment.

Figure 11:
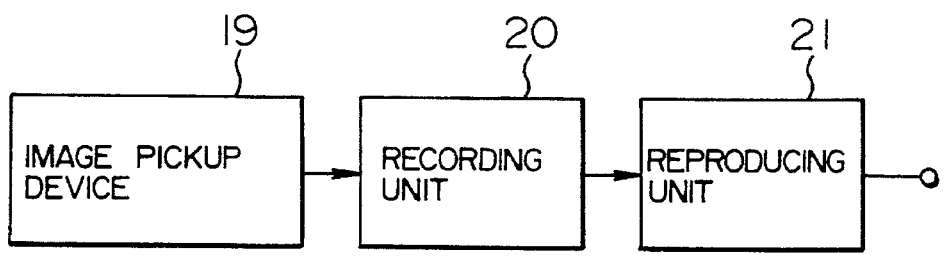
FIG. 11 illustrates one example of a camera with a recording/reproducing unit used in the image pickup device in the first to third embodiments.

FIG. 11 illustrates a video camera with a recording/reproducing device (VCR-embedded camera) using the image pickup device of the first-third embodiments. In FIG. 11, reference numeral 19 denotes the image pickup device of the first-third embodiments; 20, a recording unit which records on a magnetic tape a video signal from the image pickup device 19; and 21, a reproducing unit which reproduces a television signal from the signal recorded in the recording unit 20. Since this VCR camera uses the image pickup device of the first-third embodiments, exposure control and white balance control do not malfunction, and thus a good image quality is obtained.

As described above, according to the present invention, an image pickup ambience such as daytime, night, the indoors or the outdoors is determined on the basis of the subject distance, zooming scale factor, stop value, date or time. Control is provided depending on the image pickup ambience based on the result of the determination. Thus, malfunction of exposure control and white balance control is prevented to achieve control functions of higher performance.

What is claimed is:

1. An image quality control method in an image pickup device including image pickup means for converting an optical image of a subject to an image signal and a signal processor for producing a video signal on the basis of the image signal, said method comprising the steps of:

(a) determining image pickup ambience of the subject based on illumination of the subject and on at least one of distance to the subject and time of day, the illumination of the subject being determined by obtaining current instantaneous value of illumination of the subject; comparing the obtained current instantaneous illumination value and a most recent previous instantaneous illumination value; subtracting a predetermined value from said most recent previous instantaneous illumination value when said current instantaneous illumination value is smaller than said most recent previous instantaneous illumination value and utilizing the result of the subtracting as the illumination value of the subject; and (b) controlling image quality of the video signal produced by said signal processor in accordance with the determined image pickup ambience.

2. An image quality control method in an image pickup device including image pickup means for converting an optical image of a subject to an image signal and a signal processor for producing a video signal on the basis of the image signal, said method comprising the steps of:

(a) determining image pickup ambience of the subject based on illumination of the subject and on at least one of distance to the subject and time of day, the illumination of the subject being determined by obtaining a current instantaneous value of illumination of the subject; comparing the obtained current instantaneous illumination value and a most recent previous instantaneous illumination value; and excluding the current instantaneous illumination value when a current contrast of the subject is larger than a predetermined value; and (b) controlling image quality of the video signal produced by said signal processor in accordance with the determined image pickup ambience.

3. An image pickup device comprising:

image pickup means, including a stop member, for converting an optical image of a subject to an image signal;

a signal processor for producing a video signal from the image signal;

ambience determining means for determining image pipkup ambience of the subject based on illumination of the subject and on at least one of distance to the subject and time of day, said ambience determining means including means for obtaining a current instantaneous value of illumination of the subject; means for comparing the obtained current instantaneous illumination value and a most recent previous instantaneous illumination value; and means for subtracting a predetermined value from said most recent previous instantaneous illumination value when said current instantaneous illumination value is smaller than said most recent previous instantaneous illumination value; and control means responsive to the output of said ambience determining means for controlling at least one of said stop member and gain of chroma signals in the video signal produced by said signal processor to control image quality of the video signal produced by said signal processor.

4. An image pickup device comprising:

image pickup means, including a stop member, for converting an optical image of a subject to an image signal;

a signal processor for producing a video signal from the image signal;

ambience determining means for determining image pickup ambience of the subject based on illumination of the subject and on at least one of distance to the subject and time of day, said ambience determining means including means for obtaining a current instantaneous value of illumination of the subject; means for comparing the obtained current instantaneous illumination value and a most recent previous instantaneous illumination value; and means for excluding the current instantaneous illumination value when a current contrast of the subject is larger than a predetermined value; and control means responsive to the output of said ambience determining meads, for controlling at least one of said stop member and gain of chroma signals in the video signal produced by said signal processor to control image quality of the video signal produced by said signal processor.

5. An image pickup device comprising:

image pickup means, including a stop member, for converting an optical image of a subject to an image signal;

a signal processor for producing a video signal from the image signal;

ambience determining means for determining image pickup ambience of the subject based on at least two of illumination of the subject, distance to the subject, and time of day;

control means responsive to the output of said ambience determining means, for controlling at least one of said stop member and gain of chroma signals in the video signal produced by said signal processor to control image quality of the video signal produced by said signal processor, said control means including white balance control means for controlling gains of red and blue chroma signals in the video signal produced by said signal processor and for setting at least one of upper and lower limits of a control range for the gains of the red and blue chroma signals in accordance with the determined image pickup ambience.

6. An image pickup device according to claim 5 wherein said ambience determining means includes means for classifying the image into one of a plurality of ambience regions based on at least two of the illumination of the subject, the distance between the image pickup means and the subject, and the time of day.

7. An image pickup device comprising:

image pickup means, including a stop member, for converting an optical image of a subject to an image signal;

a signal processor for producing a video signal from the image signal;

ambience determining means for determining image pickup ambience of the subject based on at least two of illumination of the subject, distance to the subject, and time of day;

control means responsive to the output of said ambience determining means, for controlling at least one of said stop member and gain of chroma signals in the video signal produced by said signal processor to control image quality of the video signal produced by said signal processor, said control means including exposure control means for controlling said stop member in accordance with a signal obtained by adding a mean value and a peak value of the luminance signal of the video signal produced by said signal processor with a ratio set on the basis of the determined image pickup ambience.

8. An image pickup device according to claim 7 wherein said ambience determining means includes means for classifying the image into one of a plurality of ambience regions based on at least two of the illumination of the subject, the distance between the image pickup means and the subject, and the time of day.

9. An image pickup device comprising:

image pickup means for converting an optical image of a subject to an image signal;

a signal processor for producing a video signal from the image signal;

ambience determining means for determining image pickup ambience of the subject based on at least two of illumination of the subject, distance to the subject, and time of day; and white balance control means responsive to the output of said ambience determining means for controlling gains of red and blue chroma signals in the video signal produced by said signal processor and for setting at least one of upper and lower limits of a control range for the gains of the red and blue chroma signals in accordance with the determined image pickup ambience.

10. An image pickup device comprising:

image pickup means for converting an optical image of a subject to an image signal;

a signal processor for producing a video signal from the image signal;

ambience determining means for determining image pickup ambience of the subject, including means for classifying the image into one of a plurality of ambience regions based on at least two of the illumination of the subject, the distance between the image pickup means and the subject, and the time of day; and white balance control means responsive to the output of said ambience determining means for controlling gains of red and blue chroma signals in the video signal produced by said signal processor.

11. An image pickup device comprising:

image pickup means, including a stop member, for converting an optical image of a subject to an image signal;

a signal processor for producing a video signal from the image signal;

ambience determining means for determining image pickup ambience of the subject based on at least two of illumination of the subject, distance to the subject, and time of day; and exposure control means responsive to the output of said ambience determining means, for controlling said stop member in accordance with a signal obtained by adding a mean value and a peak value of the luminance signal of the video signal produced by said signal processor with a ratio set on the basis of the determined image pickup ambience in order to control a gain of the optical image.

12. An image pickup device comprising:

image pickup means, including a stop member, for converting an optical image of a subject to an image signal;

a signal processor for producing a video signal from the image signal;

ambience determining means, for determining image pickup ambience of the subject based on at least two of illumination of the subject, distance to the subject, and time of day, including means for classifying the image into one of a plurality of ambience regions based on at least two of the illumination of the subject, the distance between the image pickup means and the subject, and the time of day; and exposure control means responsive to the output of said ambience determining means, for controlling said stop member in order to control a gain of the optical image.

13. An image quality control method according to claim 1, wherein step (b) comprises correcting the configuration of a luminance signal in the video signal produced by the signal processor, and/or controlling the respective gains of red and blue chroma signals in the video signal in accordance with the determined image pickup ambience.

14. An image quality control method according to claim 2, wherein step (b) comprises correcting the configuration of a luminance signal in the video signal produced by the signal processor, and/or controlling the respective gains of red and blue chroma signals in the video signal in accordance with the determined image pickup ambience.

15. An image pickup device according to claim 3 wherein:

said control means includes configuration correcting means for correcting the configuration of the image in a luminance signal in the video signal produced by said signal processor, in accordance with the determined image pickup ambience; and said configuration correcting means performs a first correction of the configuration when said ambience determining means determines that the image is outdoors in daylight, performs a second correction when the ambience determining means determines that the image is indoors in a room, and performs a third correction when said ambience determining means determines that the image is in another location.

16. An image pickup device according to claim 4 wherein:

said control means includes configuration correcting means for correcting the configuration of the image in a luminance signal in the video signal produced by said signal processor, in accordance with the determined image pickup ambience; and said configuration correcting means performs a first correction of the configuration when said ambience determining means determines that the image is outdoors in daylight, performs a second correction when the ambience determining means determines that the image is indoors in a room, and performs a third correction when said ambience determining means determines that the image is in another location.

17. An image pickup device according to claim 5 wherein:

said control means includes configuration correcting means for correcting the configuration of the image in a luminance signal in the video signal produced by said signal processor, in accordance with the determined image pickup ambience; and said configuration correcting means performs a first correction of the configuration when said ambience determining means determines that the image is outdoors in daylight, performs a second correction when the ambience determining means determines that the image is indoors in a room, and performs a third correction when said ambience determining means determines that the image is in another location.

18. An image pickup device according to claim 7 wherein:

said control means includes configuration correcting means for correcting the configuration of the image in a luminance signal in the video signal produced by said signal processor, in accordance with the determined image pickup ambience; and said configuration correcting means performs a first correction of the configuration when said ambience determining means determines that the image is outdoors in daylight, performs a second correction when the ambience determining means determines that the image is indoors in a room, and performs a third correction when said ambience determining means determines that the image is in another location.

19. An image pickup device according to claim 3 wherein:

said control means includes gain control means for controlling gains of green, blue, and red chroma signals in the video signal produced by said signal processor, in accordance with the determined image pickup ambience; and said gain control means sets first gains when said ambience determining means determines that the image is outdoors in daylight, sets second gains when the ambience determining means determines that the image is indoors in a room, and sets third gains when said ambience determining means determines that the image is in another location.

20. An image pickup device according to claim 4 wherein:

said control means includes gain control means for controlling gains of green, blue, and red chroma signals in the video signal produced by said signal processor, in accordance with the determined image pickup ambience; and said gain control means sets first gains when said ambience determining means determines that the image is outdoors in daylight, sets second gains when the ambience determining means determines that the image is indoors in a room, and sets third gains when said ambience determining means determines that the image is in another location.

21. An image pickup device according to claim 5 wherein:

said control means includes gain control means for controlling gains of green, blue, and red chroma signals in the video signal produced by said signal processor, in accordance with the determined image pickup ambience; and said gain control means sets first gains when said ambience determining means determines that the image is outdoors in daylight, sets second gains when the ambience determining means determines that the image is indoors in a room, and sets third gains when said ambience determining means determines that the image is in another location.

22. An image pickup device according to claim 7 wherein:

said control means includes gain control means for controlling gains of green, blue, and red chroma signals in the video signal produced by said signal processor, in accordance with the determined image pickup ambience; and said gain control means sets first gains when said ambience determining means determines that the image is outdoors in daylight, sets second gains when the ambience determining means determines that the image is indoors in a room, and sets third gains when said ambience determining means determines that the image is in another location.

\* \* \* \* \*